United States Patent
Görlich

(10) Patent No.: US 6,616,566 B2
(45) Date of Patent: Sep. 9, 2003

(54) DIFFERENTIAL DRIVE

(75) Inventor: Horst Görlich, Bornheim (DE)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 09/981,354

(22) Filed: Oct. 16, 2001

(65) Prior Publication Data

US 2002/0025877 A1 Feb. 28, 2002

Related U.S. Application Data

(62) Division of application No. 09/512,143, filed on Feb. 23, 2000, now Pat. No. 6,342,025.

(30) Foreign Application Priority Data

Feb. 24, 1999 (DE) .......................... 199 07 890

(51) Int. Cl.[7] .............................................. F16H 48/10
(52) U.S. Cl. ...................................................... 475/248
(58) Field of Search ................. 475/248, 249, 475/252, 253, 198; 180/247

(56) References Cited

U.S. PATENT DOCUMENTS

| | | | | |
|---|---|---|---|---|
| 2,228,638 A | * | 1/1941 | Mercier | 475/248 |
| 2,648,236 A | * | 8/1953 | Wilson | 475/248 |
| 2,775,142 A | * | 12/1956 | Brensike et al. | 475/251 |
| 4,856,373 A | * | 8/1989 | Washizawa | 475/247 |
| 4,905,787 A | * | 3/1990 | Morin | 475/248 |
| 5,443,430 A | * | 8/1995 | Parsons | 475/248 |
| 5,947,858 A | * | 9/1999 | Williams | 180/247 |

* cited by examiner

Primary Examiner—Ankur Parekh

(57) ABSTRACT

In a differential drive having one differential carrier rotating in a housing, two side shaft gears are arranged coaxially relative to said differential carrier, and two sets of differential gears are supported in the differential carrier and rotate therewith and each engage one of the side shaft gears. The side shaft gears are crown gears and the differential gears form two sets of straight pinions which rotate on radial journals in the differential carrier, with the pinions of the two sets directly engaging one another in pairs so that, when the differential carrier is stationary, the side shaft gears are able to rotate in identical directions. In a differential drive having two differential carriers rotating in a housing, two side shaft gears are arranged coaxially relative to said differential carriers, and two sets of differential gears are supported in the differential carriers and rotate therewith, and each engage one of the side shaft gears. The side shaft gears are hollow gears and the differential gears form two sets of straight pinions serving as planetary gears, which rotate on axis-parallel journals in the differential carriers and engage one single, central, freely-rotatable pinion acting as a sun gear, so that, when the differential carriers are stationary, the side shaft gears are able to rotate in identical directions.

6 Claims, 2 Drawing Sheets

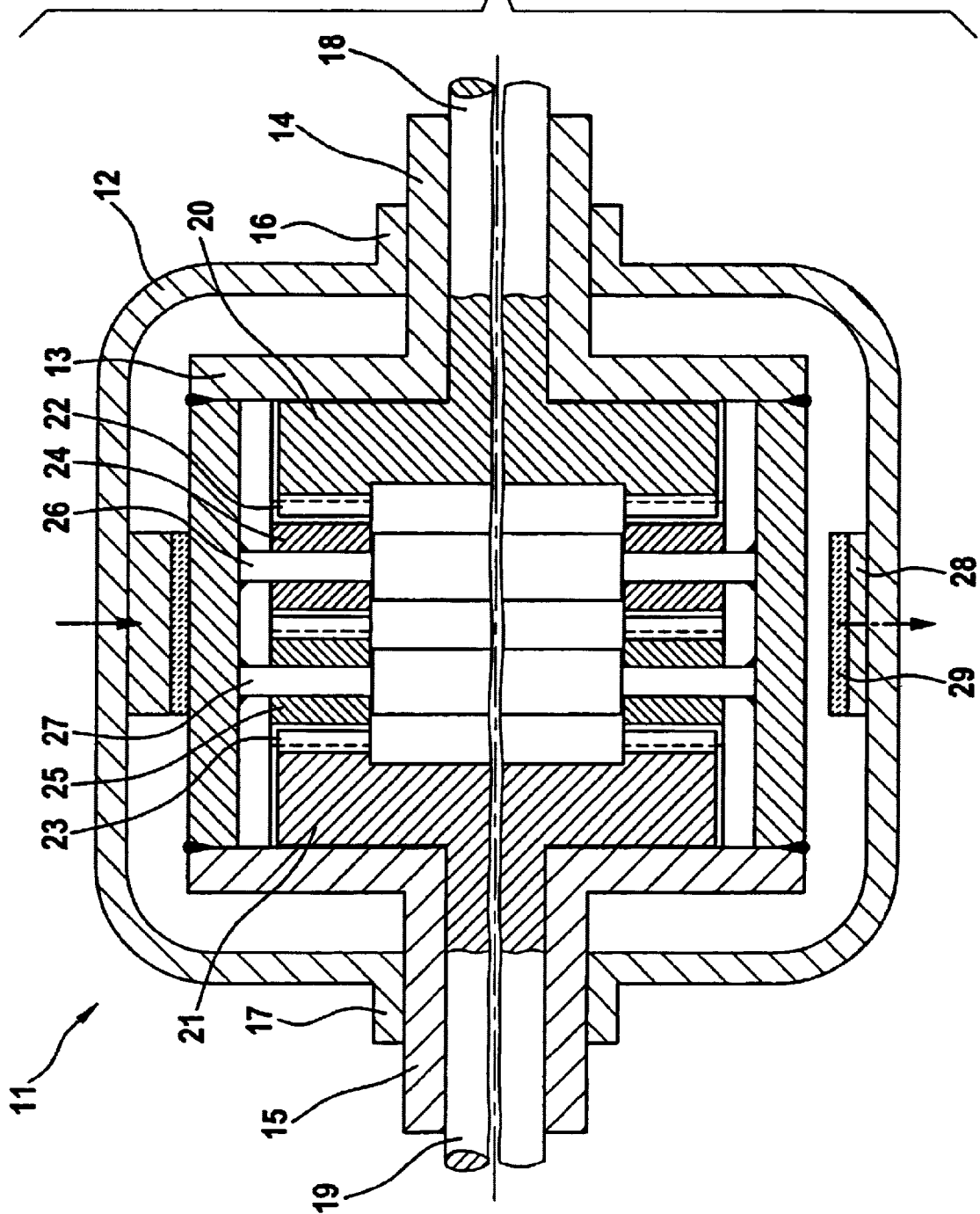

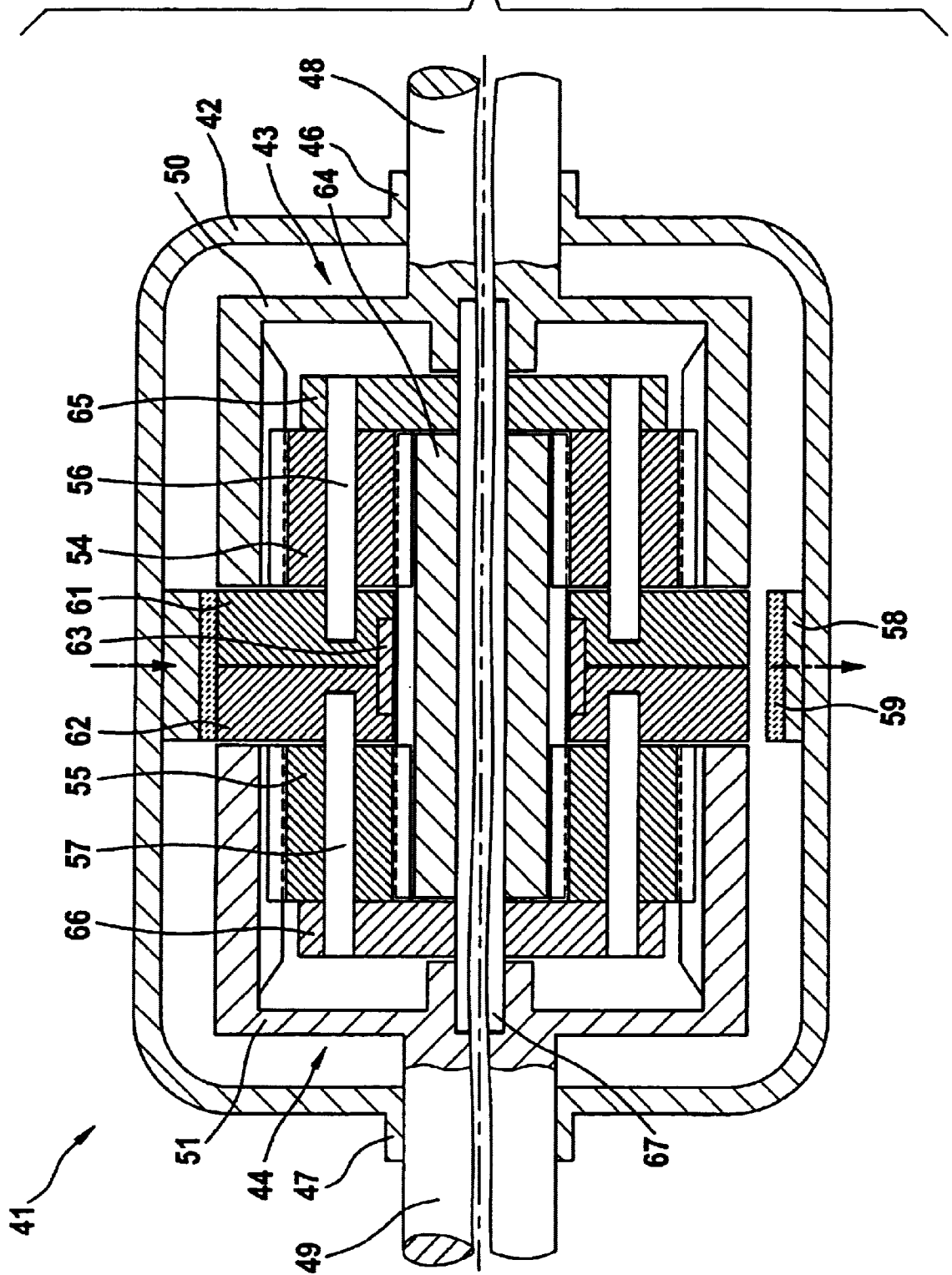

DIFFERENTIAL DRIVE

This application is a Division of application Ser. No. 09/512,143, filed Feb. 23, 2000, now U.S. Pat. No. 6,342,025.

BACKGROUND OF THE INVENTION

The invention relates to a differential drive having a differential carrier rotating in a housing, two side shaft gears arranged coaxially relative to said differential carrier, and two sets of differential gears which are supported in the differential carrier and rotate therewith and which each engage one of the side shaft gears, and, respectively, the invention relates to a differential drive having two differential carriers rotating in a housing, two side shaft gears arranged coaxially relative to said differential carriers, and two sets of differential gears which are supported in the differential carriers and rotate therewith and each engage one of the side shaft gears.

The most frequent type of differential drive is a bevel gear differential drive which, in particular, is used in the axle drives of motor vehicles. Bevel gears arranged on radial journals simultaneously engage both side shaft gears provided in the form of crown gears. If the differential carrier is stationary, the side shaft gears—if so—rotate in opposite directions relative to one another. Other applications are conceivable wherein it appears to be more advantageous if, with a stationary differential carrier, the side shaft gears are able to rotate in identical directions.

BRIEF SUMMARY OF THE INVENTION

It is the object of the present invention to provide simple differential drives which embody the above-described structure and carry out the above-described function.

In the case of a drive with one differential carrier, these objectives are achieved with side shaft gears that are crown gears and differential gears that form two sets of straight pinions which rotate on radial journals in the differential carrier, with the pinions of the two sets directly engaging one another in pairs so that, when the differential carrier is stationary, the side shaft gears are able to rotate in identical directions.

In the case of a drive with two differential carriers, these objectives are achieved with side shaft gears that are hollow gears and differential gears that form two sets of straight pinions (planetary gears) which rotate on axis-parallel journals in the differential carriers and engage one single central freely rotatable pinion (sun gear).

Each of said solutions provides a differential drive with a large share of simply designed identical parts; in particular, the differential gears are provided in the form of simple straight pinions. In both cases, the substantially symmetric design means that the side shaft gears rotate in identical directions, as desired, when the differential carrier is held in a stationary position. If, in a preferred application, the differential drive is used in a propeller shaft of a motor vehicle with a permanently-driven driving axle and a driving axle that is driven by said propeller shaft when required, there is provided a brake assembly which is effective between the differential carrier and the housing and which is provided in the form of a band brake, for example. Such a controllable brake assembly permits a jerk-free engaging or a partial locking effect between the two side shaft gears and thus between the two driving axles. When the brake assembly is released, the differential carrier can rotate freely, so that no torque can be transmitted to the second driving axle.

BRIEF DESCRIPTION OF THE DRAWINGS

The present invention will be better understood if the written description thereof is read with reference to the accompanying drawings, of which:

FIG. 1 shows a differential drive according to the first preferred embodiment.

FIG. 2 shows a differential drive according to the second preferred embodiment.

DETAILED DESCRIPTION OF THE INVENTION

FIG. 1 shows a differential drive 11 with a stationary housing 12 which, in particular, is to be connected to a motor vehicle and in which a differential carrier 13 is rotatably arranged. The differential carrier 13 is provided with sleeve projections 14, 15 which are supported in guiding bushings 16, 17 of the housing 12. Shaft journals 18, 19 of two side shaft gears 20, 21 are rotatably supported in the sleeve projections 14, 15. The side shaft gears 20, 21 are provided in the form of crown gears which each comprise crown gear toothings 22, 23 extending towards a radial central plane. Said crown gear toothings 22, 23 are engaged by differential gears 24, 25 which are provided in the form of straight pinions and which engage one another in pairs. Said differential gears 24, 25 are supported on bearing journals 26, 27 which radially pass through the differential carrier 13. Between the housing 12 and the differential carrier 13 there is provided a brake assembly 28, which is shown only symbolically. In the upper half of the drawing, the brake assembly 28 is shown between the housing 12 on which it is supported, and the differential carrier 13 against which it exerts braking pressure by means of a friction lining 29, as indicated by a radial arrow. In the lower half of the drawing, the friction lining 29 of the brake assembly 28 is shown lifted away from the differential carrier 13 so as to remove braking pressure, the direction of its motion also indicated by a radial arrow. When the brake assembly 28 is in operation, i.e., exerting braking pressure against differential carrier 13, the shaft journals 18, 19 are able to rotate in identical directions.

FIG. 2 shows a differential drive 41 with a stationary housing 42 which, in particular, is to be connected to a motor vehicle and in which two axis-parallel differential carriers 43, 44 are rotatably arranged. The differential carriers 43, 44 are each composed of inner plates 61, 62, outer plates 65, 66 and journals 56, 57 which are pressed or welded together or otherwise rigidly connected to one another. Prior to the connecting operation, the differential gears 54, 55 are slid on to the journals. The differential carriers 43, 44 are jointly supported on a plug-in shaft 67 on which a central pinion 64 is rotatably supported. The ends of the plug-in shaft 67 are freely rotatably supported in the shaft journals 48, 49. A sleeve 63 axially and radially supports the differential carriers relative to one another. Two side shaft gears 50, 51 are rigidly connected to the shaft journals 48, 49. The side shaft gears 50, 51 are provided in the form of hollow gears which are open towards a radial central plane. The side shaft gears are engaged by the differential gears 54, 55 which are provided in the form of straight pinions. Between the housing 42 and the differential carriers 43, 44 there is provided a brake assembly 58, which is shown only symbolically. In the upper half of the drawing, the brake assembly 58 is shown between the housing 42 on which it is supported, and the differential carriers 43, 44 against which it exerts braking pressure by means of a friction lining 59, as indicated by a radial arrow. In the lower half of the drawing, the friction lining 59 of the brake assembly 58 is shown lifted away from the differential carriers 43, 44 so as to remove braking pressure, as also symbolically indicated by a radial arrow. When the brake assembly is in operation, the shaft journals 48, 49 are able to rotate in identical directions.

Certain modifications and variations of the disclosed embodiments of the present invention will be apparent to those skilled in the art. It should be understood that the disclosed embodiments are intended to be illustrative only, and not in any way restrictive of the scope of the invention as defined by the claims set forth hereunder.

I claim:

1. A differential drive (41) having two differential carriers (43, 44) rotating in a housing (42), two side shaft gears (50, 51) arranged coaxially relative to said differential carriers (43, 44), and two sets of differential gears (54, 55) which are supported in the differential carriers (43, 44) and rotate therewith and which each engage one of the side shaft gears (50, 51), wherein said side shaft gears (50, 51) are hollow gears and said differential gears (54, 45) form two sets of straight pinions serving as planetary gears, which rotate on axis-parallel journals (56, 57) in said differential carriers (43, 44) and engage one single, central, freely-rotatable pinion (64) acting as a sun gear, so that, when said differential carriers (43, 44) are stationary, said side shaft gears (50, 51) are able to rotate in identical directions.

2. A differential drive according to claim 1, further comprising brake means (58, 59) mounted within said housing (42) selectively operative to exert braking pressure against said differential carriers (43, 44).

3. A differential drive according to claim 2, wherein said brake means comprises a band brake.

4. In a motor vehicle with a differential drive having two differential carriers rotating in a housing; and two side shaft gears arranged coaxially relative to said two differential carriers; and two sets of differential gears which each are supported in said two differential carriers and rotate therewith and which each engage one of said side shaft gears, the improvement comprising: means operative to lock said differential drive and wherein said side shaft gears (50, 51) are hollow gears and said differential gears (54, 55) form two sets of straight pinions serving as planetary gears, which rotate on axis-parallel journals (56, 57) in said differential carriers (43, 44) wherein said two differential carriers engage one single, central freely-rotatable pinon (64) acting as a sun gear, so that, when said differential carriers (43, 44) are stationary, said side shaft gears (50, 51) are able to rotate in identical directions.

5. The motor vehicle according to claim 4, further comprising brake means (58, 59) mounted within said housing (42) selectively operative to exert braking pressure against said differential carriers (43, 44).

6. The motor vehicle according to claim 5, wherein said brake means comprises a band brake.

* * * * *